Jan. 29, 1946. W. C. RUECKEL 2,393,658
COKE-OVEN WALL CONSTRUCTION
Filed April 25, 1941
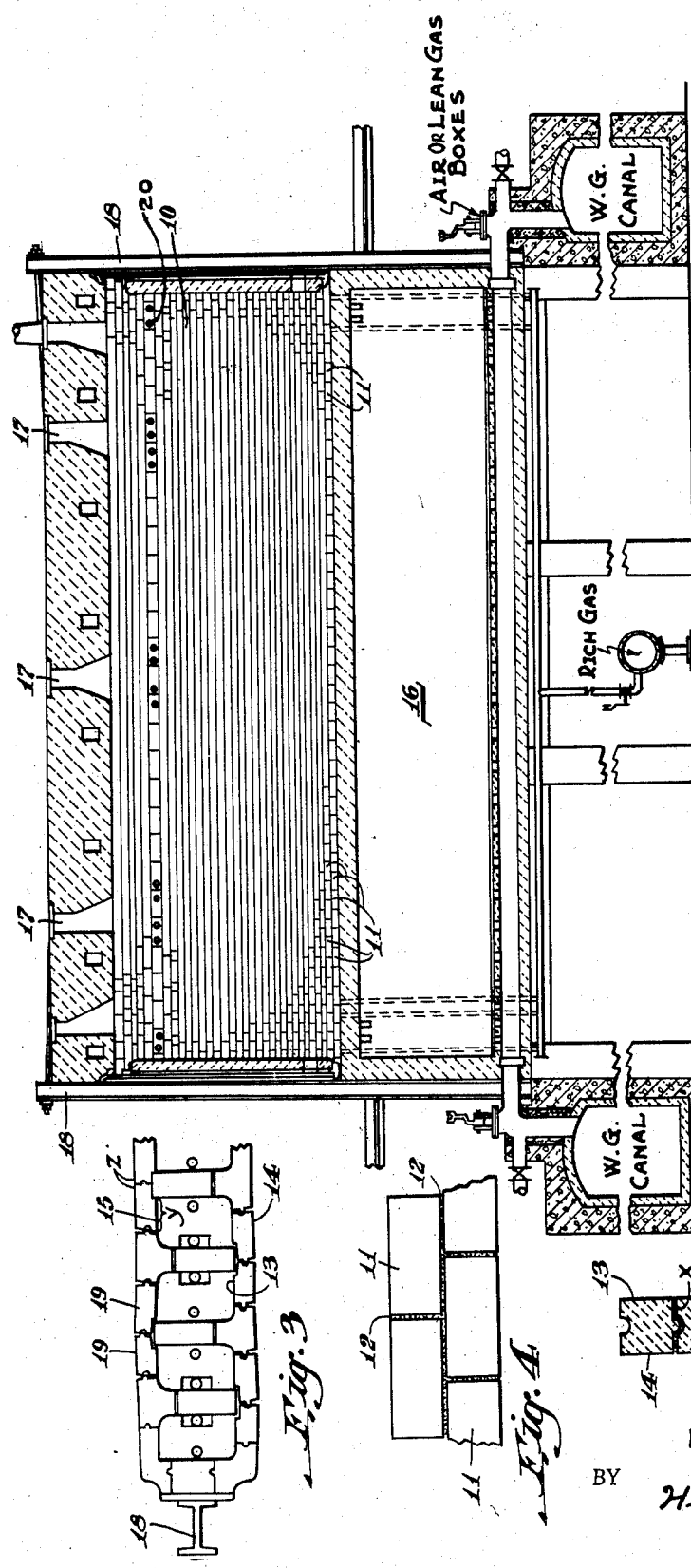
INVENTOR.
WALTER CLARENCE RUECKEL.
BY Henry Love Clarke
his atty.

Patented Jan. 29, 1946

2,393,658

UNITED STATES PATENT OFFICE 2,393,658

COKE-OVEN WALL CONSTRUCTION

Walter Clarence Rueckel, Pittsburgh, Pa., assignor, by mesne assignments, to Koppers Company, Inc., a corporation of Delaware Application April 25, 1941, Serial No. 390,256

20 Claims. (Cl. 202—223)

The present improvement relates to coke ovens in general and more especially to coke ovens of the type comprising coking chambers and their heating walls that are formed of refractory materials having within their structure a crystalline modification of silica, and it comprehends such improvements in their preparation for operation that discrete moieties of the refractory materials wherefrom they are formed can be substantially completely bonded together throughout their entire extent to form heating walls having a novel unitary structure and an improved rigidity and resistance to external stresses.

An object of the present invention is the provision of coke ovens wherein more particularly the brickwork and the mortar of the refractory masonry comprising the coking-chamber heating-surfaces are substantially completely bonded together without loss of refractoriness by a crystalline, non-glassy bond that consolidates them into a rigid, coherent, monolithoid structure of improved strength and impenetrability to coal, carbon particles, pitchy constituents of the former, and the gases of carbonization.

A further object of invention is the provision of improvements in method of heating-up coke ovens whereby the above-mentioned objects are realizable.

The invention has for further objects such other improvements and such other operative advantages or results as may be found to obtain in the processes or apparatus hereinafter described or claimed.

According to the present improvement the masonry of individual coke-oven heating walls formed more especially of silica bricks, is converted, without loss of high-temperature refractoriness into a monolithoid structure having an improved impenetrability and enhanced resistance to both internal and external pressures, by means of a special novel heating process therefor that involves the employment of unusually high temperatures and of the recrystallizability of the crystalline forms of silica in the mortar as well as also those that are potentially available at the said higher temperatures in the fired bricks themselves to unite the said mortar and bricks in a reasonable length of time with a crystalline, non-vitreous bond that is substantially co-extensive with all the brick-joints in a coke-oven heating wall.

Silica bricks are used almost exclusively in the construction of modern coke ovens. They are laid-up in a refractory mortar that exhibits to only a very minor degree any tendency to vitrification even at temperatures above those normally employed in high-temperature coking. In their manufacture the silica bricks are formed of highly-silicious particulate quartz rock such, for example, as ganister to which is added about two per cent of calcium oxide, this mixture being mixed with water for purposes of tempering and a small amount of an organic binder that assists the molded bricks in retaining their shapes after drying and before they are fired. The tempered mixture is then formed, by shaping in molds, into bricks having the configurations required by the particular design of coke oven and by the location they are to occupy in the finished structure. Having been reduced to the required shape, the moist bricks are dried and thereafter fired in kilns to bond their ingredients by means of a predominantly crystalline bond into a rigid aggregate.

In the firing operations, the temperature of the dried bricks is gradually raised to incandescence and to temperatures as high as 2600°–2700° F. and during that time important changes take place in the crystalline structure of the quartz component, and the extent to which these changes are brought about is a decisive criterion of their suitability for use in coke-oven construction because it determines the relative permanency of their resultant dimensions and the amount of crystal-interlocking by which they are predominantly bonded.

The quartz employed in the manufacture of silica bricks is a crystalline modification of silica having a specific gravity of 2.65 and is a form thereof unstable at the elevated temperatures reached during the brick-firing operations and in the course of which it tends to convert into a plurality of crystal forms of silica that represent its stable forms at the attained firing-heats. Above about 1588° F. and up to 2678° F. the stable crystalline form of silica is tridymite having a specific gravity of 2.27 and above the latter temperature the stable form is cristobalite of which the specific gravity is 2.33.

The conversion by heat alone of the one of said crystal forms of silica and the other is not a rapid reaction but is on the contrary very sluggish and the complete conversion from the one to another is effected only after prolonged heating within the determining temperature-range of stability; this is confirmed by the fact that fragmentary crystals even of quartz itself have been observed to survive more particularly in the oven-side of silica-brick heating walls even after years of continued heating at temperatures considerably above the lowest temperature at which quartz initially converts to another crystal form. In addition to that sluggishness, characterizing its conversion into another crystalline modification and prolonging any establishing of a static crystal state in bricks formed therefrom, is the seemingly anomolous phenomenon that, within one temperature-range of heating, the quartz comprising the newly-molded bricks converts first into a crystalline form that is the stable form in a yet higher temperature-range before assuming the crystal form that is stable at the existing lower temperature-range: specifically, even though tridymite is the stable form of silica between about 1588°–2678° F., the quartz of the bricks during its heating between these temperatures first converts to cristobalite, which is the stable crystalline form above 2678° F. and the unstable form between about 1588°–2678° F., before it converts to and arrives at the tridymite form. When, however, it is considered, as abovementioned, that quartz, cristobalite and tridymite with their specific gravities decreasing respectively from 2.65 to 2.33 to 2.27 are crystal forms wherein there is in the stated order an increasingly greater molecular rearrangement and consequent consumption of energy requisite to produce them, this apparent singularity of fact is not inconsistent with the natural law that when matter changes from one stable phase to a phase that is stable under other conditions it passes through stages of decreasing instability and does not pass directly to the new phase of stability.

The above-given phenomena relating to the conversion of quartz into other crystalline modifications of silica have been delineated for the purpose of indicating and of emphasizing the fact that most of the crystal forms of silica present in kiln-fired silica bricks employed for coke-oven construction are in a rather transitionary state or condition of arrested crystal conversion and that they will be subject to further alteration and growth with additional heating, the amount and the rate depending on the degree of heating, and that during such alteration or growth in the existing crystal forms, they have the ability to combine, unite, or join with adjacently converted or converting crystals, and whether or not they are in the same or adjacent bricks or in intervening mortar, to form a stable crystalline bonding therebetween having great strength and a resistance that is frequently greater between adjacent mortar and bricks than is that of the internal structure of the bricks themselves.

In confirmation of the hereinabove stated it is of interest to note at this point that well-fired silica bricks employed in the building of coke ovens have a distribution of crystalline forms of silica that lies within substantially the following representative limits of composition:

|   | Per cent |
|---|---|
| 1. Cristobalite | 65 to 80 |
| 2. Tridymite | 5 to 10 |
| 3. Unconverted quartz and silicates | 10 to 20 |

In the accompanying drawing forming a part of this specification and showing for the purposes of exemplification a preferred apparatus and method in which the invention may be embodied and practiced but without limiting the claimed invention specifically to such illustrative instance or instances:

Fig. 1 is a section taken crosswise of a battery of horizontal coke ovens and through a coking chamber thereof showing the masonry of one of the coking-chamber heating-wall surfaces;

Fig. 2 is an enlarged horizontal view taken through Fig. 1 and showing the heating flues and structural detail of the masonry of one heating wall;

Fig. 3 is a plan view of a portion of a heating wall exhibiting a condition that sometimes develops during operation in the masonry thereof and which the present improvement is designed to correct or at least ameliorate;

Fig. 4 is an enlarged view of a fragment of the heating wall of the coke oven of Fig. 1 and showing the disposition of the mortar and the bricks of the masonry; and Fig. 5 is a partial vertical section taken crosswise of the heating-wall of Fig. 2 and along the line V—V thereof and showing the tongue-and-groove arrangement between adjacent brick-tiers of the liner bricks of a heating wall.

The same characters of reference designate the same parts in each of the views of the drawing.

Referring now to the drawing: the coking-chambers of a coke-oven battery are each formed between a spaced pair of flued heating walls 10 of which the masonry comprises, in most modern coke ovens, tiers of silica bricks 11 and, intermediate the individual bricks and each tier thereof, a layer of special mortar 12 having a refractoriness only slightly less than that of the bricks themselves. The material of the silica bricks has a Pyrometric Cone Equivalent (hereinafter referred to as P. C. E.) of about 3000°–3056° F. and shows upon chemical analysis a content of approximately 95 to 96% of silica, 2% of lime and about 2% of such so-called impurities as iron oxide, alumina, and the like. The mortar or cement in which they are customarily set is prepared from silica brickbats, raw ganister, and a silicious clay, the finished mortar containing 92 to 94% of silica, and from 6 to 8% of alumina, iron oxide, lime, etc., and having a P. C. E. of between about 2940 to 3000° F. The P. C. E. of the mortar wherein the silica bricks are set has thus a P. C. E. of not more than about 100° F. lower than the bricks themselves, and it is obvious that the attempting the forming of any substantial vitreous bonding between such mortar and the bricks would involve heating the heating-wall masonry to temperatures very close to the P. C. E. of the bricks themselves and this would be most hazardous to the integrity of the whole structure, firstly, because of the practical difficulty of maintaining the entire mass of a heating wall with its extensive surfaces at the required high temperatures without giving rise to local fluxing of the refractory and, secondly, because any substantial vitrification of the mortar would occasion subsidence and misalignment of the brick-tiers in the masonry and seriously impair the utility of the structure. All such unwanted circumstances are obviated through the medium of the present invention which provides heating conditions whereby the mortar and bricks of the masonry become bonded together by the growth of crystalline forms of silica itself, the bonding agency having thus substantially the same refractoriness as the structural bricks.

The features of the present novel method and means whereby the special bonding together of the separate parts of a coke-oven heating wall is brought about to produce the monolithoid structure of the present invention will be best understood by reciting in general outline, with reference to the drawing, the usual prior practice employed in the heating-up of newly-erected coke ovens and by an accompanying description of the changes it produces in the heating-wall structure. In preparing a new coke-oven battery for coking operations, it is the usual practice, before charging any coal into the ovens for carbonization purposes, to raise the heating-wall masonry at both the heating-flue and the coking-chamber sides, respectively 13, 14, of Fig. 2, to temperatures of about 2000°–2100° F. which are usually adequate to coke an oven-charge in a period of about twenty-four hours. To attain these temperatures a period of several weeks is required, it being necessary to raise the temperature by slowly increasing steps, especially through well-known temperatures at which the divers crystal forms of silica in the bricks undergo abrupt expansion, so as to not disrupt the brickwork alignment. A very rapid expansion of the silica bricks per degree of temperature increase takes place between the temperatures of about 200°–500° F. and which is attributable to their large content of cristobalite. The initial drying and heating is usually accomplished by burning gas, beneath temporary hearths in the coking chambers themselves, delivered by nozzles inserted either through therefor-provided openings in the oven doors or through special bulkheads of bricks built-up as temporary substitutes, the combustion-products being drawn by stack draft through pluggable openings into the heating flues and thence in the usual manner into the regenerators and the stack. When temperatures of about 1600° F. have been in this manner attained throughout the coking-chamber structure and combustion can take place normally in the heating flues, heating gas is introduced by means of the fuel-gas distribution system into the heating flues 15, where it is burned by air delivered from regenerators 16 in the well-known manner. At this time, in the event temporary bulkheads have been employed in place of the coke-oven doors, they as well as the hearths are removed from the coking-chambers, and the removable doors are placed in the coking-chamber mouths. When combustion of fuel gas in the heating flues has raised the heating-wall temperatures to about 2000°–2100° F., at both the flue-side and the oven-side of a heating wall, to-be-carbonized coal is first charged into the coking-chambers through charging holes 17. This increase in temperature from 1600° to 2100° F. in the heating walls is effected in a period of about two days.

During the weeks that have transpired up to this point in the heating-up process, substantially no change has taken place in the mortar other than to dry it; the crystalline nature of the comminuted quartz and of the forms of silica in the brickbats has not been altered to any substantial degree nor has any vitrification of its clayey component appeared that could bond the other said ingredients together or to the bricks themselves. Thus, at the time that coal is normally first charged into the coking-chambers of a coke-oven battery, as practiced in the prior art, there has been scarcely even a rudimentary bond established between the component parts of the heating walls, the mortar exhibiting practically no resistance to abrasion and serving in effect at these low temperatures merely to fill in inequalities between adjacent brick surfaces and to prevent a flow of products between the heating flues and the coking-chambers which could otherwise take place through interspaces of adjacent bricks were the mortar not present. This circumstance is substantiated by the fact that after many years of continuous operation at considerably higher temperatures in the heating flues the mortar layer more especially adjacent the oven side of a dismantled heating wall falls away from the bricks with slight tapping.

For a better understanding of the operation of the present improvement and its results, it is pertinent to indicate at this point that after cold coal has been charged into the coking-chambers and as long thereafter as they continue in normal use for the production of coke, heat is being continuously extracted from the heating walls and that the temperatures at the oven-side, 14, of a heating wall never again attain those obtaining at the flue-side, 13, there being a temperature differential therebetween at the least of about 200° F. and as high as 700° F., depending on the height of the temperatures carried in the heating flues.

In decreasing the coking-time from the above-mentioned period of twenty-four hours at which time the flue temperatures are about 2100° F., the temperatures maintained in the heating walls are increased by burning additional fuel gas in the heating flues thereof. In those portions of the heating masonry where temperatures of about 2400° F. are reached, a condition naturally first attained at the heating-flue side of a heating wall, important changes begin to be apparent in the masonry-mortar; that is, a vitrification of its clayey component begins to bind the comminuted quartz and brickbats thereof together into a sort of agglomerate. In addition to this vitrification there is, at the said temperature of 2400° F., simultaneously initiated another reaction which contributes to the bonding of the mortar, said reaction being an importantly increased activity in the recrystallization of the modification of silica present therein. During this recrystallization, the quartz of the ganister begins relatively briskly to grow and to recrystallize into cristobalite, adjacent changing crystals tending to attach to each other and to interlock and to crystallize with existing cristobalite, that has its origin in the fired silica brickbats, the entire changing crystalline pattern being further complicated by the tendency of the both said crystal forms to change into a third form—tridymite—and being also accelerated by the small amounts of the above-mentioned vitrified clay which sluggishly and without direction migrates through the pores between the mortar grains, the latter being present however in amounts sufficient to effect an incipient bonding only but insufficient to cause any noticeable fluxing or subsidence in the mortar layers. Thus, at the flue-side of a heating wall, a rather rudimentary bonding of the ingredients of the mortar will be initiated at about 2400° F. but it will extend in the direction of the coking-chamber, however, only a very limited distance, if the coking-chambers are being used for the production of coke, in consequence of the temperature gradient through the wall caused by the rapid removal of heat for carrying on the carbonization process; with a temperature of 2400° F. at the flue-side of a heating wall, the temperature at the oven-side may still be only 2000° F. or less, which is, as already stated, too low to effect any bonding within the adjacent mortar not to mention a bonding therebetween and the bricks.

This recrystallization reaction, at about 2400°

F., does not involve the adjacent surfaces of the brickwork and it is substantially completely restricted to the mortar itself wherein it is enabled to take place by reason of its higher content of basic oxides and alumina which have the property of promoting the reaction. A very minor growth of new silica crystals can result at the said temperature of 2400° F., over a very long period of time to establish an incipient bridging or bonding between those crystals present in the mortar and the bricks; however, the extent of such bonding and the time required to effect it is of little practical utility in attaining the object of the present improvement.

If the temperatures of the heating-wall masonry for any reason, as for example further decreasing the coking time, are raised to about 2600°-2700° F., a relatively rapid recrystallization of the silica in the mortar as well as that in the bricks begins to take place and crystal growths, extending therebetween and involving forms of silica in the both, are produced and the bricks and mortar become thereby so securely bonded together that the structure of the bricks themselves frequently yields under stress before the surface of their contacts with the mortar. The extent of such bond follows rather closely the isothermal lines of 2600°-2700° F. in the heating wall and is not achieved to any important degree beyond them and it is therefore not sufficient to establish temperatures of 2600-2700° F. at the flue-side of a heating wall and to ignore those simultaneously obtaining at the oven-side thereof when perfecting a complete crystalline bonding of the bricks and mortar of a heating wall according to the present improvement, and for this reason the preferred result is difficult to accomplish in a normally operating coke oven, because, as already indicated, there is a temperature gradient between two such heating wall sides and a temperature of 2700° F. can exist at the flue-side of the masonry while at the oven-side, through the intervening 4 or 5 inches of silica bricks, the temperature may be as low as 2100° F. This is clearly demonstrated by the fact that in silica coke-ovens, that have been continuously operated for nearly twenty years at diverse coking rates, there has been found, upon their dismantling, at the flue-side and extending toward the oven-side of the heating wall for a distance of from somewhat less to slightly more than one inch, i. e. for example to the point $x$ in Fig. 5, an incipient to an extensive bonding by silica recrystallizations, between the mortar and the adjacent bricks, which are characteristically produced at the said higher temperatures and the extensive production of which is an object of the present improvement, while the remaining portions of the mortar-joints were, even after this long period of operation, still in a relatively crumbly and friable condition and easily broken away from the brick surfaces.

Consistent with the objects of the present improvement and their practical achievement, coke-oven heating walls comprising silica bricks set in highly-silicious mortar are heated to temperatures that are sufficiently high at both the flue-side and the oven-side of a heating wall to cause a relatively rapid and extensive new growth of crystalline forms of silica that will unite the mortar and the bricks of said heating wall from end-to-end and from side-to-side thereof into a crystalline-bonded monolithoidal structure. The temperatures usually required for the purpose are not substantially less than about 2600°-2700° F.; the rate of growth of new crystals of silica increases rapidly with increase of temperature above substantially these, but, because silica begins rapidly to fuse at about 3000° F. and because of the very considerable length and mass and attendant dimensional increase of a heating wall and also the difficulty of maintaining throughout the entire mass thereof, with great precision in the uniformity of heat distribution, such higher-than-normal coke-oven operating temperatures, the employment of temperatures much above 2800° F. may constitute a real hazard for the structure. When temperatures of 2600°-2800° F. are attained at both the flue- and the oven-sides of a heating wall, for instance by carefully continuing combustion in the heating flues until such temperatures are reached and then maintaining them under careful control so as to "heat-soak" the heating wall through from flue-side to oven-side for a limited period of usually not more than a few days, the so-produced crystalline growth of silica is allowed to continue until a secure bonding between all component parts of the heating wall is produced. At the end of such a period of "soaking" at the unusually high temperatures, it will be found that a mortar-joint, such as that shown in Fig. 5, will, throughout its entire extent between both heating-wall faces and instead of only up to some point as "$x$" therein, have changed from a yellowish to a whitish color and will be relatively impervious and have an importantly increased resistance to abrasion, and the whole heating wall will present improved resistance to both internal and external pressures such as result, for example, from charging the ovens with a coal that expands during the coking process.

Other advantages accrue to a monolithoidal heating wall bonded according to the present invention. Firstly, in consequence of the fact that the preferred bonding temperature is above that at which the residual quartz of the bricks converts relatively rapidly to another form of silica, substantially all the potential permanent expansion of a heating wall, which in the course of years can amount to some inches and for which compensating adjustments of the pressure imposed by the retaining buckstays 18 thereon must be made from time to time, is substantially completely developed and thus eliminated from consideration in a short period; and, secondly and of important significance as result of the above, conditions whereby there can develop a substantial differential growth between the length of a heating-wall's masonry at the flue-side and the coke-side are advantageously practically eliminated. The importance of this feature for the integrity of a coke-oven heating wall is of considerable moment. As hereinabove mentioned, the differential temperature between the flue-side and the oven-side of an operating coke-oven can be several hundreds of degrees Fahrenheit; if, therefore, adjacent the former side, 13, temperatures exist at which recrystallization and growth of the silica in the bricks takes place while adjacent the latter side, 14, the temperatures are too low to promote such reaction, the dimensions of the bricks at the hotter flue-side sooner or later will grow to exceed those at the other. This dimensional increase must be somehow accommodated to avoid fracture of the bricks. The buckstays 18 located at the heating-wall ends are adjustable to regulate perpendicular pressures exerted against them and to retain the brickwork in alignment under so-applied pressures, but, in the event pressures of a tangential nature develop within the interior of the brickwork itself, the buckstays only serve to accentuate the buckling effect of such force. As a result then, of the differential dimensions that can develop between the two said faces of the heating-wall bricks, their resultant oblique pressures against each other, augmented by the pressures of the buckstays, are resolved into a considerable force acting perpendicularly of the surfaces 13, 14, and, with some portion of their joint-faces functioning as a bearing point, heating-wall liner-bricks 19, 19, will be moved out of alignment with the remainder of the wall in the direction of a coking-chamber, as is clearly shown by the drawing in Fig. 3, thereby providing the space required to accommodate the brick-growth. This is a phenomenon not infrequently observed to greater or lesser degree in the bowing of coke-oven heating walls, and if there is no, or but little, bonding between the mortar and the bricks of a heating wall, as may well be the case if its oven-side has never been heated sufficiently high to establish such condition, their resistance to oven-ward movement is greatly reduced below that potentially available by employment of the present invention. Furthermore, any buckling movement of any of the bricks of a heating wall is reflected along the entire length thereof and applies to other brick-surfaces tangential forces that occasion either spalling or such a weakening of the wall as increases its susceptibility to disruptive attack. If, for example, a disproportionate growth of the surface $y$ of Fig. 3 causes that brick to tend to move oven-ward, exerting an angular pressure at the points $z$, there may ultimately develop at these points sufficient force to break off the corners of one or both bricks. When such circumstance takes place, charged coal or carbonization gases can enter the void and respectively coke or deposit carbon therein which during the operation of pushing the oven can break off further portions of the brick-work.

The present invention is adapted to prevent the development of the above-described eventualities by providing that, preferably but not necessarily, before any coal is charged into the coking-chamber of a coke-oven battery, the entire masonry mass of its heating walls from the flue-side to the oven-side thereof is heated to temperatures at which both an active conversion of residual forms of highly-expansible silica in the bricks is brought about in a short time and dangerous differential after-growth of different sides of a heating wall over a long period is substantially eliminated, and to temperatures at which also the forms of silica in the employed highly-refractory mortar are caused to develop and to grow other crystal forms of silica that bond both the ingredients of the mortar and the adjacent brick-surfaces into a monolithoidal mass that involves the brick-joints throughout their entire extent and also shows no loss of refractoriness or extensive vitrification in the whole.

From the above-given it will now be obvious that, in the novel coke-oven heating wall of the invention, those portions of the mortar joints, that are, more especially, flush with the brick-surfaces at their coking-chamber sides and consequently in direct contact with coal being carbonized, have been sealed with a well-bonded abrasion-resisting material of high impenetrability in contrast to their incoherent, friable, and porous condition obtaining in the prior art. There will thus be little tendency for mortar to be stripped from the joint spaces during oven operation and thereby to expose brick corners to mechanical attack or breakage and into the resultant voids of which gases of carbonization can enter and crack and so deposit accumulations of carbon behind the brick faces to weaken their structure. In consequence of the improved bonding, isothermal lines of a heating wall are maintained throughout in planes that are in substantial parallelism with its oven face, thereby establishing conditions whereby, under such thermal shock as takes place during charging and pushing operations, and the like, all portions of any brick face will be subjected to the same amount of contraction; this is in sharp contrast to the situation that exists when the joints are porous, or partially divested of their mortar, and cooling gases can penetrate behind the heating-wall face and so give rise in each brick to isothermal lines that are rather semi-elliptical in shape, thus causing the edges of the bricks under shock to contract more than the interior portion thereof and encouraging spalling at its edges.

A refractory wall formed according to the present principle is especially useful in apparatus employed for the cracking or the carbonization of such liquids as divers pitches or oils, that assume a liquid phase in contact therewith, because of its enhanced resistance to penetration of the said liquids and so-engendered spalling.

Divers applications of this improvement whereby the well-known silica bricks and highly silicious bricks and mortar comprising recrystallizable forms of silica can be bonded together to form a structure of great strength will be apparent to those skilled in the art, and it will be further obvious to them that, because of the higher temperatures involved, precautions must be taken appropriately to protect portions of any such structure comprising refractories formed from clay. To the coke-oven operator it will be obvious that any hearths used in the coking-chambers during the heating-up period should, in the case of silica-brick walls, be also formed of silica bricks as well as the temporary bulkheads employed to close the coking-chamber mouths during the interval of high temperatures, and that the buckstays must be arranged to accommodate the increased growth of the heating walls.

The invention as hereinabove set forth is embodied in particular form and manner but may be variously embodied within the scope of the claims hereinafter made.

I claim:

1. A coke-oven battery having a flued heating wall therein adjacent a coking-chamber, said heating wall forming the side face of the coking chamber and comprising masonry formed of spaced bricks with mortared joints both containing the product of a temperature-alterable crystalline modification of silica in excess of that stoichiometrically combinable with constituent agents adapted to vitrify the same, the bricks and mortar of said heating wall being mutually bonded at least part way inwardly from its surface that forms the side face of the coking-chamber throughout the length and height of said heating wall into a monolithoidal structure by the recrystallized silica developed from the temperature-alterable silica thereof by subjecting the same to heating to an elevated temperature, above a lower limit of between 2600° F.

and 2700° F., at which, and until, such bonding recrystallization occurs.

2. A coke-oven battery having a flued heating wall therein adjacent a coking-chamber, said heating wall comprising masonry formed of spaced silica bricks with highly-silicious mortared joints both containing the product of a temperature-alterable crystalline modification of silica in excess of that stoichiometrically combinable with constituent agents adapted to vitrify the same, said bricks and mortar being mutually bonded at least part way inwardly from the surface of the heating wall that forms the side face of the coking-chamber into a monolithoidal structure throughout the length and height of said heating wall by the recrystallized silica developed from said temperature-alterable silica by subjecting the brick and mortar of the masonry at least part way inwardly from the coking-chamber surface aforesaid to an elevated temperature above about 2600° F. and until mutually bonded as aforesaid into the monolithoidal structure by such recrystallization.

3. A coke-oven battery having a flued heating wall therein adjacent a coking-chamber, said heating wall comprising the product of masonry formed of pre-fired silica brick having joints of highly silicious mortar comprising quartz and a minor amount of clay, the bricks and said mortar of the entire heating wall being mutually bonded from the flue-side through to the coking-chamber side of said heating wall into a monolithoidal structure by the recrystallized silica mutually contained in the structure of said bricks and mortar and developed by heating the masonry from the flue-side through to the coking-chamber side to an elevated temperature, above a lower limit of between about 2600° F. and 2700° F., at which such bonding recrystallization occurs without fluxing of the bricks.

4. A coke-oven battery having a flued heating wall forming the side of a coking chamber and formed of bricks and of mortar containing the product of heat-unstable crystalline silica, the bricks and mortar of said heating wall being mutually bonded from substantially the flue-side through to the coking-chamber side of said heating wall substantially throughout its length and height by recrystallized silica developed by heating said heating wall substantially throughout its thickness to a temperature above about 2600° F., at even the lower-temperature side of such wall.

5. A coke-oven battery having a refractory flued heating wall forming the side face of a coking chamber and comprising the product of pre-fired silica and a bonding medium therefor comprising a modification of silica that alters its physical structure when heated to an elevated temperature, the pre-fired silica and bonding medium substantially throughout the length and height of said heating wall being monolithoidally bonded from substantially the flue-side through to the coking-chamber side of the heating wall by the crystalline forms of silica developed by heating said heating wall in situ throughout its thickness to an elevated temperature above a lower limit of between about 2600°–2700° F. at even the lower-temperature side of such wall.

6. A coke-oven flued heating wall constituting the side face of a coking chamber and formed in situ having the characteristics produced by heating substantially throughout its length and height, from its flue-side through to its coking-chamber side, silica of a crystalline modification that is stable at a higher temperature in the presence of a highly-silicious bonding agent therefor containing silica of a modification that is stable only at a lower temperature, said heating being sufficiently high, above a lower limit of between about 2600° F. and 2700° F., to cause silica of the lower temperature stability, from the flue-side through to the coking chamber side, to crystallize, without substantial vitrification, into intrusive accretion with the existing silica crystals of the higher-temperature stability and so to bond them together from the flue-side through to the coking-chamber side of said heating wall into a monolithoidal structure.

7. A coke-oven flued heating wall constituting the side face of a coking-chamber and formed in situ having the characteristics produced by heating substantially throughout its length and height, from its flue-side through to its coking-chamber side silica of a crystalline modification that is stable at a higher temperature in the presence of a highly-silicious bonding agent therefor containing silica of a modification that is stable only at a lower temperature, said heating including a temperature of at least about 2600° F. so as to cause silica of the lower-temperature stability, from the flue-side through to the coking-chamber side, to crystallize, without substantial vitrification, into intrusive accretion with the existing silica crystals of the higher-temperature stability and thereby to bond them together from the flue-side through to the coking-chamber side of said heating wall into a monolithoidal structure.

8. The method of preparing, for coking operations, of an in situ coke-oven flued heating wall constituting the side face of a coking chamber and formed of spaced bricks with highly-silicious mortared joints both containing a temperature-alterable crystalline modification of silica in excess of that stoichiometrically combinable with other constituent agents capable of vitrifying the same, said method comprising the steps of, heating the heating wall substantially throughout its length and height and thickness to a temperature, above a lower limit of between about 2600° F. and 2700° F., that is at least above that at which said temperature-alterable crystalline silica is converted to another crystalline modification thereof but is below that at which substantial deformation of said highly-silicious mortar occurs by combustion alongside the brickwork of the wall while the wall is under conditions whereby it may soak-up the heat of combustion until it reaches the temperature aforesaid substantially throughout its length and height and thickness, and continuing such heating by combustion and maintaining the aforesaid temperature substantially throughout the length, height and thickness of the wall under the aforesaid conditions until the mortar and bricks thereof are mutually bonded from substantially the flue-side through to the coke-oven side of the wall into a monolithoidal structure by the said recrystallizations of silica.

9. The method of preparing, for coking operations, of an in situ flued coke-oven heating wall constituting the side face of a coking-chamber and formed of spaced silica bricks having highly-silicious mortared joints containing a crystalline form of silica that is recrystallizable into another crystalline modification thereof at an elevated temperature, said method comprising the steps of heating said heating wall substantially throughout its length and height to a temperature equaling at the oven-side thereof at least that temperature, above a lower limit of between 2600° F. and 2700° F., at which recrystallization of said crystalline form of silica occurs by combustion alongside the brickwork of the wall while the wall is under conditions whereby it may soak-up the heat of combustion until it reaches the temperature aforesaid throughout its length and height, and continuing said heating of the oven side-face of the heating wall and maintaining the aforesaid temperature substantially throughout the length and height of the oven side-face of the heating wall until under the aforesaid conditions there is produced by said recrystallization of silica an extensive and substantially non-vitreous mutual bonding between said silica bricks and mortared joints that reaches for a substantial distance inwardly from the oven-side of said heating wall and comprises intrusive accretions of recrystallized silica that are structurally held in common by said bricks and mortar.

10. The method of preparing, for coking operations, of an in situ coke-oven heating wall constituting the side face of a coking chamber and having heating flues and formed of spaced pre-fired silica bricks with highly-silicious mortared joints containing a crystalline form of silica that is recrystallizable into another crystalline modification thereof at an elevated temperature, said bricks and mortar having a Pyrometric Cone Equivalent of at least about 3000° F. and 2940° F., respectively, said method comprising the steps of, heating said heating wall throughout substantially its length and height to temperatures of at least about 2600° F., but below that at which the silica fuses, at both the flue-side and the oven-side thereof by combustion alongside the brickwork of the wall while the wall is under conditions whereby it may soak-up the heat of combustion until it reaches the temperature aforesaid throughout its length and height, and continuing said heating by combustion to maintain at least the aforesaid temperature at both sides substantially throughout the length and height of the wall under the aforesaid conditions until there is produced by the recrystallization of said crystalline silica an extensive and substantially non-vitreous mutual bonding between said silica bricks and mortared joints that reaches from substantially the flue-side to the oven-side of said heating wall and comprises intrusive accretions of recrystallized silica that are structurally held in common by said bricks and mortar.

11. In a method of preparing, for coking operations, of an in situ coke-oven heating wall constituting the side face of a coking chamber and provided with heating flues comprising masonry and formed of spaced silica bricks and highly-silicious mortared joints therefor containing uncombined silica that is recrystallizable at an elevated temperature, said silica bricks and mortar having Pyrometric Cone Equivalents of at least about 3000° F. and 2940° F., respectively, the step comprising, heating said flued heating wall substantially throughout its length and height to temperatures of at least about 2600° F. at the oven-side thereof, so as to promote recrystallization of the silica of said mortar by combustion alongside the brickwork of the wall while the wall is under conditions whereby it may soak-up the heat of combustion until it reaches the temperature aforesaid throughout its length and height, and maintaining such heating of the oven-side of the wall as aforesaid under the aforesaid conditions until said recrystallization has produced a mutual bond of the bricks and mortar at the oven-side face of said heating wall substantially throughout its length and height.

12. The method of preparing, for coking operations, of a coke-oven battery having in situ refractory heating walls forming the side faces of coking chambers and comprising pre-fired silica and a bonding medium therefor containing an amount of a modification of silica that alters its physical structure when heated to an elevated temperature of at least about 2600° F. and is in excess of that which is combinable with other constituents of said bonding medium that are adapted to vitrify the same, said method comprising the steps of, heating said heating walls each substantially throughout their length and height and thickness until the temperature at both sides thereof is at least that at which said temperature-alterable silica as aforesaid changes its physical structure by combustion alongside the brickwork of the wall while the wall is under conditions whereby it may soak-up the heat of combustion until it reaches the temperature aforesaid substantially throughout its length and height and thickness, and continuing such heating by combustion to maintain at least such temperature throughout substantially the length and height and thickness of said heating walls under the aforesaid conditions until there is produced substantially throughout their length and height a mutual bonding between the said pre-fired and the said temperature-alterable silica that bonds the respective heating walls from their flue-sides through to their coking-chamber sides into individual monolithoidal structures.

13. The method of substantially eliminating potential differential expansibility between the flue-side and the oven-side of an in situ flued coke-oven heating wall containing more especially a minor amount of quartz, said method comprising the steps of heating said heating wall substantially throughout its length and height to a temperature of at least about 2600° F. but below its fusion temperature at both the flue-side and the oven-side of said heating wall by combustion alongside the brickwork of the wall while the wall is under conditions whereby it may soak-up the heat of combustion until it reaches the temperature aforesaid throughout its length and height, and continuing said heating of said wall substantially throughout its length and height under the aforesaid conditions until its length remains substantially constant at a preferred temperature of heating.

14. In a coke-oven battery, a flued refractory heating wall forming the side wall of a coke-oven chamber and monolithoidally bonded at the oven-side thereof substantially throughout its length and height by crystalline silica having the characteristics produced by heating in situ in such a wall, to a temperature between 2600° and about 3000° F., pre-fired silica in the presence of a bonding agent therefor containing a modification of silica that recrystallizes at the temperature of said heating.

15. The method of preparing, for coking operations, of an in situ coke-oven flued heating wall constituting the side face of a coking chamber and formed of spaced bricks with highly-silicious mortared joints both containing a temperature-alterable crystalline modification of silica in excess of that stoichiometrically combinable with other constituent agents capable of vitrifying the same, said method comprising the steps of, heating the heating wall substantially throughout its length and height and at least a substantial part of its thickness inwardly from its coking chamber face-side to a temperature that is at least above that at which said temperature-alterable crystalline silica is converted to another crystalline modification thereof, but is below that at which substantial deformation of said highly-silicious mortar occurs by combustion alongside the brickwork of the wall while the wall is under conditions whereby it may soak-up the heat of combustion until it reaches the temperature aforesaid, throughout its length, height and such thickness, and continuing such heating by combustion and maintaining the aforesaid temperature throughout the length, height and such thickness of the wall under the aforesaid conditions until the mortar and bricks thereof are mutually bonded to at least a substantial distance from the coke chamber side toward the flue-side of the wall into a monolithoidal structure by the said recrystallizations of silica.

16. The method of monolithizing in situ one of the heating walls of one of the oven-chambers of a coke-oven battery of the type comprising a series of alternate coking chambers and heating walls therefor arranged side-by-side in a row, each of said oven-chambers having closeable openings for introduction of fuel to be coked and for withdrawal of distillate gas and finished coke therefrom, and each of said heating walls comprising internal combustion flues and constituting one of the side faces of adjacent oven-chambers, and being formed of spaced pre-fired silica bricks with highly-silicious mortared joints both containing a temperature-alterable crystalline modification of silica, convertible to another crystalline modification thereof when heated to a temperature above 2600° F., in excess of that stoichiometrically combinable with other constituent agents capable of vitrifying the same; said method comprising: heating said one of said heating walls of said one of said oven-chambers substantially throughout its length and height to a temperature of at least about 2600° F. but below that at which the silica fuses, by combustion of fuel in the combustion flues of said heating wall, while the aforesaid closeable openings for withdrawal of finished coke from said oven-chamber are sealed-off to retain in the oven chamber the heat transmitted thereto from the heating flues through said heating wall until a temperature above 2600° F. but below that at which the silica fuses is established in the heating wall from its flue-side to its said oven-side; and continuing the heating of said heating wall as aforesaid while said oven-chamber is sealed-off as aforesaid until the mortar and the bricks are mutually bonded into a monolithoidal structure by recrystallization of the temperature-alterable silica of the mortar and the bricks throughout the length and height of the wall from its flue-side to the said oven side of said heating wall.

17. A method as claimed in claim 16, and in which the heating of said heating wall during the continuance of heating of the same while sealed as aforesaid is continued for a limited period of time of not more than a few days.

18. A method as claimed in claim 16, and in which said one of said oven-chambers is maintained substantially empty of fuel to be coked during the aforesaid heating of said heating wall for the same and sealing of the same as aforesaid.

19. A method as claimed in claim 16, and in which said one of said oven-chambers is maintained substantially empty of fuel to be coked during the aforesaid heating of said heating wall for the same and sealing of the same as aforesaid, and in which the closeable openings for withdrawal of coke are temporarily sealed by heat retaining temporary bulkhead barriers subsequently replaceable by conventional coke oven doors.

20. The method of monolithizing in situ one of the heating walls of one of the oven-chambers of a coke-oven battery of the type comprising a series of alternate coking chambers and heating walls therefor arranged side-by-side in a row, each of said oven-chambers having closeable openings for introduction of fuel to be coked and for withdrawal of distillate gas and finished coke therefrom, and each of said heating walls comprising internal combustion flues and constituting one of the side faces of adjacent oven-chambers, and being formed of spaced pre-fired silica bricks with highly-silicious mortared joints both containing a temperature-alterable crystalline modification of silica, convertible to another crystalline modification thereof when heated to a temperature above 2600° F., in excess of that stoichiometrically combinable with other constituent agents capable of vitrifying the same; said method comprising: heating said one of said heating walls of said one of said oven-chambers substantially throughout its length and height and at least a substantial part of its thickness inwardly from its oven face-side to a temperature of at least about 2600° F. but below that at which the silica fuses while the aforesaid closeable openings for withdrawal of finished coke from said oven-chamber are sealed-off to retain the heat in the oven-chamber, until a temperature above 2600° F. but below that at which the silica fuses is established in the wall to at least a substantial distance inwardly from its said oven-face side; and continuing the heating of said heating wall as aforesaid while said oven chamber is sealed-off as aforesaid until the mortar and the bricks of said wall throughout the length and height thereof are mutually bonded into a monolithoidal structure to at least a substantial distance inwardly from the coking chamber side toward the flue-side by recrystallization of the temperature-alterable silica of the mortar and the bricks thereof.

WALTER CLARENCE RUECKEL.